Aug. 5, 1952  V. GENTILE, JR  2,605,639
FLOW TUBE DIFFERENTIAL PRESSURE PRODUCER
Filed April 30, 1949  2 SHEETS—SHEET 1

INVENTOR.
VINCENT GENTILE JR.
BY
E. C. Sanborn
ATTORNEY.

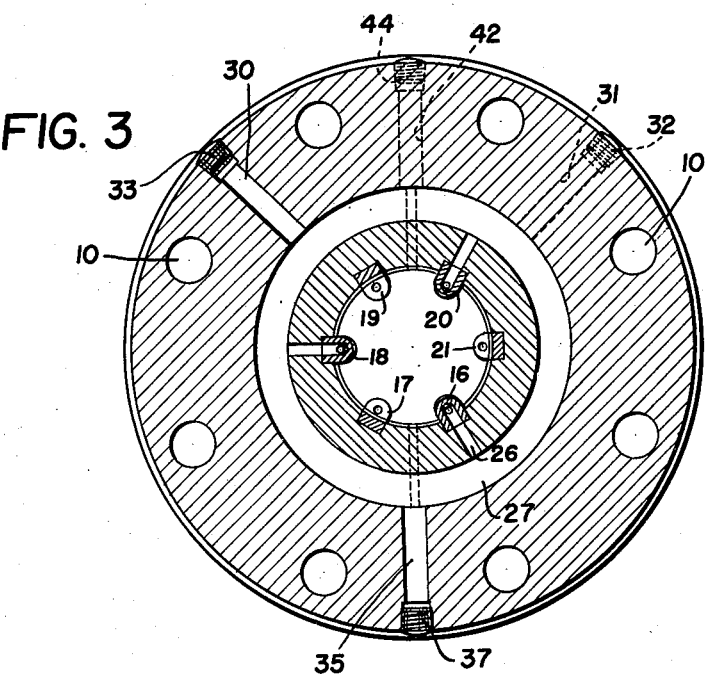
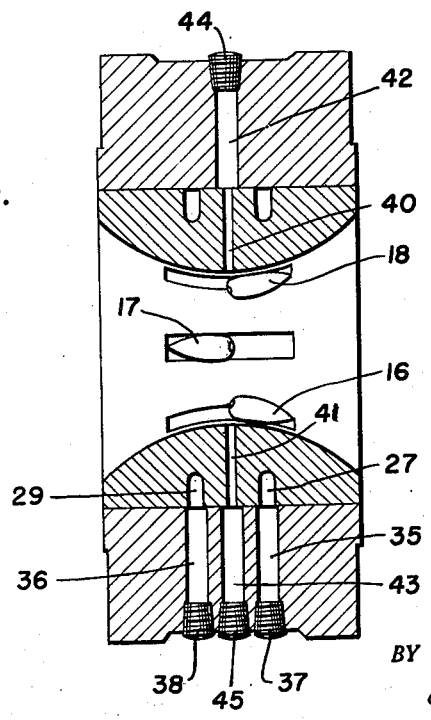

Patented Aug. 5, 1952

2,605,639

UNITED STATES PATENT OFFICE 2,605,639

FLOW TUBE DIFFERENTIAL PRESSURE PRODUCER

Vincent Gentile, Jr., Brooklyn, N. Y.

Application April 30, 1949, Serial No. 90,669

3 Claims. (Cl. 73—272)

This invention relates to devices for measuring the velocity or quantity rate of flow of a liquid or a gaseous medium.

In my Patent No. 2,260,019, issued October 21, 1941, I have disclosed a flow tube having groups of nozzles closely adjacent to the inner surface of the tube and facing in opposite directions for measuring the flow rate or velocity of fluids, and presenting distinct advantages over Venturi tubes as pointed out in said patent.

The present invention provides a new and improved flow tube having novel features which contribute to increased accuracy and efficiency over a wide range of fluid-velocity measurements.

A feature of the invention comprises a flow tube having groups of nozzles opening into a central portion of a continuously curved section of the flow tube passage.

Another desirable feature provided by the invention comprises groups of nozzles circumferentially spaced and facing in opposite directions with their impact openings in a common plane normal to the flow tube axis.

Other features and advantages of the invention will be hereinafter described and claimed.

In the accompanying drawings:

Fig. 3 is a transverse vertical sectional view on line 3—3 of Fig. 2.

Fig. 4 is a longitudinal vertical section on line 4—4 of Fig. 1.

Figure 1:
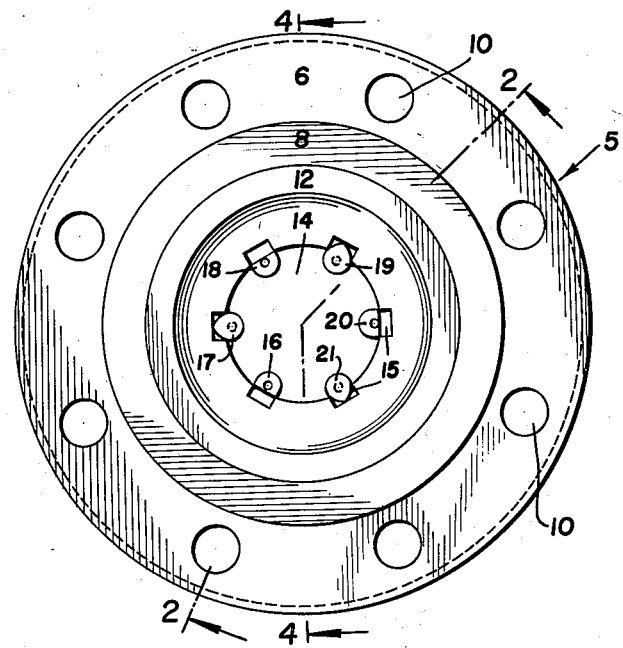
Fig. 1 is an end view of a preferred embodiment of the invention.
Figure 2:
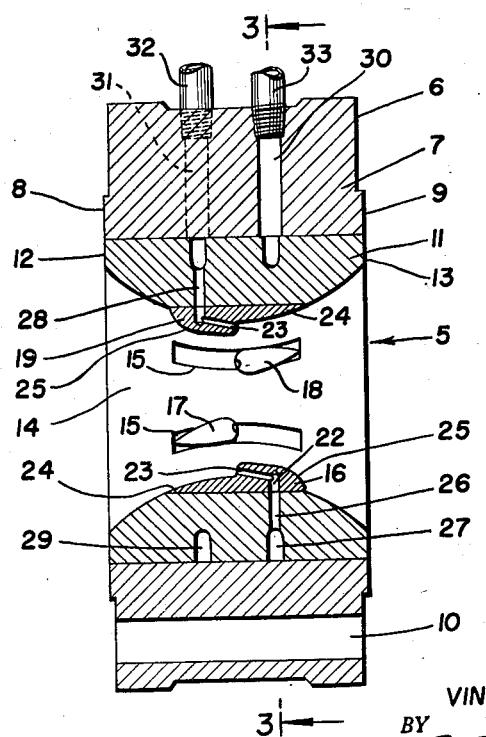
Fig. 2 is a longitudinal vertical sectional view of said embodiment, taken on line 2—2 of Fig. 1.

Referring to the drawings, a flow tube unit 5 is provided of any desirable length and diameter. The tube may have flanged end portions projecting outwardly beyond the main body portion of the tube, as in my above-mentioned patent; or, as shown in this application, said tube may comprise an outer radial portion 6 coextensive with the inner portion 7 of the tube throughout the major part of its length, but terminating a short distance from the ends of said inner portion so that said ends form circular bosses 8 and 9 projecting beyond the ends of said outer portion 6, and adapted to fit firmly into the open ends of adjacent pipe sections to unite the latter.

Said outer portion 6 of the tube is provided with holes 10 for receiving bolts to fasten the tube securely to flanges of said adjacent pipe sections, as will be apparent.

Into the inner section 7 there is securely fitted a tubular liner 11, having its ends 12 and 13 substantially coincident with the end faces of the bosses 8 and 9, as shown. From each end, the interior surface of said liner 11 curves inwardly to the central transverse plane of the liner, thus providing a throat or flow passage 14 which decreases in cross-section from each end to the center. Preferably, the flow passage 14 has a continuous curvature from end to end; and curves uniformly inwardly from one end to the center of the passage, and uniformly outwardly from the center to the other end, the curvature being preferably the same from said center to each of the ends. The curvature formed in a longitudinal section of the throat or liner is preferably a conic (circle, ellipse, parabola, or hyperbola), but need not be of any particular form. Nor need the curvature between one end and the center of the throat be a duplicate of the curvature between the center and the other end.

Portions of the central region of the throat 14 are recessed, as indicated at 15, to receive nozzles 16, 17, 18, 19, 20, and 21. Each nozzle, as shown, may comprise a body having an interior radial passage 22 and a passage 23 extending transversely from said radial passage and opening into the throat or flow passage 14. The nozzles 16, 18, and 20 form one circumferential group, having their opening or passages 23 pointing upstream. Nozzles 17, 19, and 21 form a second circumferential group, the passages 23 of which point downstream. Each nozzle body has a curved surface 24 extending from a point below the nozzle passage 23 to an end of said body, with curved surface preferably merges with the adjacent curvature of the throat 14. Also, the portion of each nozzle body which extends from a point above the passage 23 to the opposite end of said body is curved as shown at 25. The nozzle bodies may be secured in any suitable manner, as by press-fitting, or sweating in the respective recesses 15 provided therefor in the liner 11.

The nozzles 16, 18, and 20 are preferably spaced equidistantly (i. e., 120°) from each other, as are also the nozzles 17, 19, and 21. The ends of all of the six nozzle passages 23 which open into the throat 14 are in a common plane normal to the central longitudinal axis of said throat. This common plane is preferably equidistant from the ends 12 and 13 of the throat.

The passages 22 of the nozzles 16, 18, and 20, communicate through intermediate passages 26 with an annular chamber or manifold 27 in the liner 11. Likewise, the passages 22 of the nozzles 17, 19, and 21 communicate through intermediate passages 28 with an annular chamber or manifold 29 in said liner.

Ports 30 and 31 in the flow tube communicate with the respective annular chambers or manifolds 27 and 29. These ports communicate through pipes 32, 33 with any suitable manometer or other instrument (such as shown at 14 in my copending application Serial No. 734,785, filed March 14, 1947, now Patent No. 2,573,430) responsive to the difference between the pressures in said manifolds 27 and 29.

It will be noted that the nozzles 16-21 are quite small relative to the internal diameter of the throat 14 and that their passages 23 have their end portions opening into said throat very closely adjacent to the inner surface of the throat wall.

In the measurement of the velocity or quantity rate of flow of a fluid flowing through the throat 14, there will be impressed on the upstream group of nozzles a total head equal to the static head plus the velocity head, or calling this head H, there is obtained $$H = d + \frac{V^2}{2g}$$

where $h$=static head, and $$\frac{V^2}{2g} = \text{the velocity head}$$

On the downstream group of nozzles, there will be impressed a total head equal to the static head minus the velocity head, or calling this pressure H', there is obtained.

$$H' = h - \frac{V^2}{2g}$$

The differential head that would be recorded in this case would be $$H - H' = h + \frac{V^2}{2g} - \left(h - \frac{V^2}{2g}\right) = 2\frac{V^2}{2g}$$

This is equal to two velocity heads at the nozzles and by suitable calibration of the metering device may be converted to read in any desired units of flow, either in terms of average velocity or quantity flowing per unit of time.

The provision of the curved throat 14, into the central portion of which the nozzle passages extend, increases the velocity of flow past the nozzles and thus greatly increases the differential pressure (which varies as the square of the velocity). Substantial increase in precision and accuracy of measurement of the flow rate is thereby attained.

The mounting of the two groups of nozzles facing in opposite directions with all of their impact passages 23 in a common plane normal to the axis of the conduit effects further desirable advantages. It eliminates any frictional loss between the two groups. It also eliminates any effect on the downstream group due to any turbulence at the trailing edge of the upstream group. Accuracy of flow-rate measurement is thus additionally enhanced. The provision of a common throat diameter for both groups of nozzles also obviates errors in machining tolerances which might arise where the impact openings of the respective nozzle groups are spaced from each other in different parts of the flow passage.

The annular chambers 27, 29, may, as shown, be provided with drain ports 35, 36, normally closed by threaded plugs 37, 38. Also, ports 40, 41, may be drilled through the liner 11, as shown in Fig. 4 and may communicate with ports 42, 43, which are drilled through the flow tube, for attachment to a manometer or the like, whenever measurement of the static pressure in the throat 14 may be desired. Normally, said ports 42, 43 are closed by plugs 44, 45.

It will readily be seen that the illustrative embodiment of my invention above described provides an economical, efficient, compact, and flexible apparatus for producing a differential pressure in either direction, which may be employed to indicate, record, or regulate the flow of a fluid.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In apparatus of the character described, a conduit having a curved interior throat for the passage of a fluid, said throat being curved inwardly from opposite ends toward the center thereof, two groups of nozzles within said curved throat and adjacent the wall thereof, the nozzles in each group being circumferentially spaced apart, each of said nozzles having a bore opening at one end into said throat, the bores in the nozzles of the respective groups facing in opposite directions, and the open ends of said bores in the nozzles of both groups being in a common plane normal to the longitudinal axis of said conduit.

2. In apparatus of the character described, a conduit having a curved throat for the passage of a fluid, said throat being continuously curved inwardly from opposite ends to a central portion thereof, two groups of nozzles adjacent the wall of said throat, the nozzles in each group being circumferentially spaced apart, each of said nozzles having a bore opening at one end into the central portion of said throat, the bores of the nozzles of the respective groups facing in opposite directions and the open ends of said bores in the nozzles of both groups being in a common plane normal to the longitudinal axis of said conduit.

3. In apparatus of the character described, a conduit having a curved throat for the passage of a fluid, said throat being continuously curved inwardly from opposite ends to a central portion thereof, two groups of nozzles in said throat and adjacent the wall thereof, the nozzles in each group being circumferentially spaced apart, each of said nozzles having a bore opening at one end into the central portion of said throat, the bores of the nozzles of the respective groups facing in opposite directions and the open ends of said bores in the nozzles of both groups being in a common plane normal to the longitudinal axis of said conduit, means comprising a first manifold communicating with the bores of the nozzles in one of said groups for receiving pressure therefrom, and means comprising a second manifold communicating with the bores of the nozzles in the other of said groups for receiving pressure therefrom.

VINCENT GENTILE, Jr.

REFERENCES CITED

The following references are of record in the file of this patent:

UNITED STATES PATENTS

| Number | Name | Date |
| --- | --- | --- |
| 1,698,314 | Mapelsden | Jan. 8, 1929 |
| 2,260,019 | Gentile | Oct. 21, 1941 |

FOREIGN PATENTS

| Number | Country | Date |
| --- | --- | --- |
| 196,134 | Great Britain | Apr. 19, 1923 |